(No Model.)
H. P. WHITE.
CYLINDER AND CONCAVE TOOTH FOR THRASHING MACHINES.
No. 251,981. Patented Jan. 3, 1882.
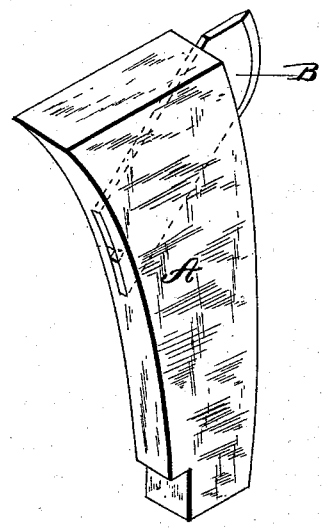

United States Patent Office.

HENRY P. WHITE, OF PAW PAW, MICHIGAN.

CYLINDER AND CONCAVE TOOTH FOR THRASHING-MACHINES.

SPECIFICATION forming part of Letters Patent No. 251,981, dated January 3, 1882.

Application filed October 18, 1881. (No model.)

*To all whom it may concern:*

Be it known that I, HENRY P. WHITE, of Paw Paw, in the county of Van Buren and State of Michigan, have invented certain new and useful Improvements in Cylinder and Concave Teeth for Thrashing-Machines; and I do hereby declare that the following is a full, clear, and exact description thereof, reference being had to the accompanying drawing, and to the letters of reference marked thereon, which forms part of this specification, in which is represented in perspective a cylinder or concave tooth with my improvement attached to or inserted therein.

The object I have in view is to obviate the difficulty experienced in thrashing grain by reason of the straw getting crosswise or bent during the operation of the machine, and thereby impairing its perfect working.

My invention relates to teeth for thrashing-machines; and it consists in a cylinder or concave tooth provided with a cutting-blade, substantially as will be hereinafter more fully set forth.

To enable others skilled in the art to make and use my invention, I will now proceed to describe its construction.

A represents a cylinder or concave tooth of the usual and well-known form. In the lower part of the tooth, as seen in dotted lines, I provide an inclined slot at an angle of about forty-five degrees, and in this slot I insert and properly secure the knife or cutting-blade B. This blade should be beveled or slightly rounded upon its cutting side, with its lower end straight and on a line with the end of the tooth. It is of course advisable to so secure the blades that in the event of their becoming dull or broken they may be removed for repair. It will thus be seen that the straw and bands which lie in such a position as will prevent them from being properly beaten will be cut and the heads will be brought by the action of the cylinder in a position to admit of their being thoroughly cleaned.

Having thus fully described my invention, what I claim, and desire to secure by Letters Patent, is—

The combination, with a thrashing-machine cylinder or concave tooth, of a cutting-blade secured thereto, substantially for the purpose herein set forth.

In testimony that I claim the foregoing as my own I affix my signature in presence of two witnesses.

HENRY P. WHITE.

Witnesses:
CHARLES E. GALLIGAN,
HIRAM A. COLE.